(12) United States Patent
Totani et al.

(10) Patent No.: US 9,291,822 B2
(45) Date of Patent: Mar. 22, 2016

(54) LIGHT GUIDE PLATE AND VIRTUAL IMAGE DISPLAY DEVICE EQUIPPED WITH THE SAME

(75) Inventors: Takahiro Totani, Suwa (JP); Masayuki Takagi, Shiojiri (JP); Toshiaki Miyao, Matsumoto (JP); Akira Komatsu, Kamijima (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 893 days.

(21) Appl. No.: 13/272,548

(22) Filed: Oct. 13, 2011

(65) Prior Publication Data

US 2012/0098734 A1    Apr. 26, 2012

(30) Foreign Application Priority Data

Oct. 21, 2010   (JP) .................................. 2010-236195

(51) Int. Cl.
*G02B 27/01* (2006.01)
*F21V 8/00* (2006.01)

(52) U.S. Cl.
CPC .......... *G02B 27/0172* (2013.01); *G02B 6/0018* (2013.01); *G02B 6/0038* (2013.01); *G02B 2027/0147* (2013.01)

(58) Field of Classification Search
CPC .......................... G02B 27/01–27/0189; G02B 27/106–27/1066; G02B 27/14; G02B 27/143–27/146; G02B 2027/01–2027/0198

USPC ................... 359/13, 629–633, 850–851, 866; 345/7–9; 348/115; 385/31, 129–132
See application file for complete search history.

(56) References Cited

U.S. PATENT DOCUMENTS

| 7,418,170 | B2 | 8/2008 | Mukawa et al. |
| 7,453,612 | B2 | 11/2008 | Mukawa |
| 7,724,443 | B2 * | 5/2010 | Amitai .......................... 359/633 |
| 2003/0165017 | A1 | 9/2003 | Amitai |
| 2004/0085649 | A1 | 5/2004 | Repetto et al. |

FOREIGN PATENT DOCUMENTS

| CN | 1774661 A | 5/2006 |
| CN | 1892271 A | 1/2007 |
| JP | A-2003-536102 | 12/2003 |
| JP | A-2004-157520 | 6/2004 |

\* cited by examiner

*Primary Examiner* — Stephone B Allen
*Assistant Examiner* — James McGee
(74) *Attorney, Agent, or Firm* — Oliff PLC

(57) ABSTRACT

The sizes of the respective reflecting units vary in the image take-out section along the Z direction in association with the state of the total reflection angle in the light guide section. Thus, it becomes possible to keep the sufficient effective light beam width of the image light input thereto in all of the reflecting units. Therefore, the deterioration in the image light caused by the reflection in the reflecting units can be avoided, and as a result, the degradation of the resolution of the image due to the virtual image light thus emitted can be prevented.

17 Claims, 7 Drawing Sheets

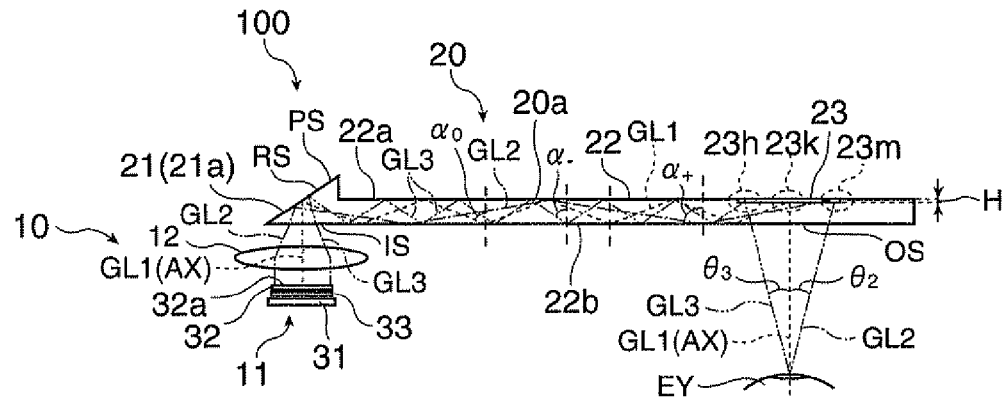
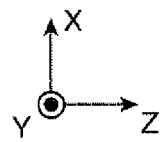
FIG. 1A
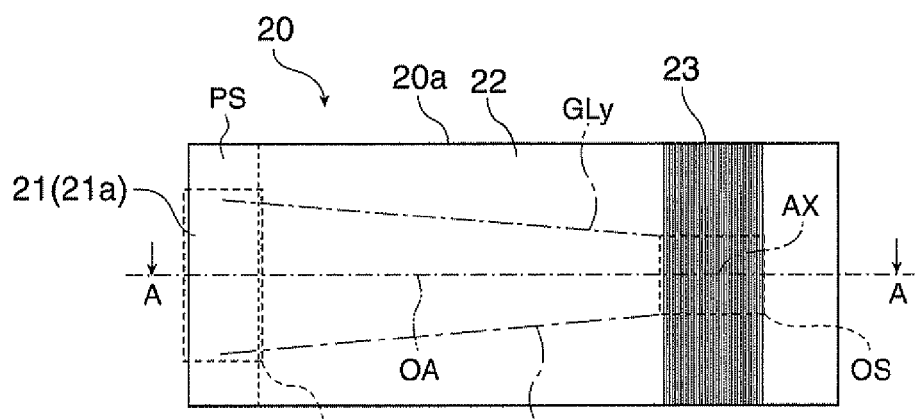
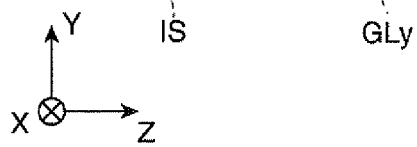
FIG. 1B
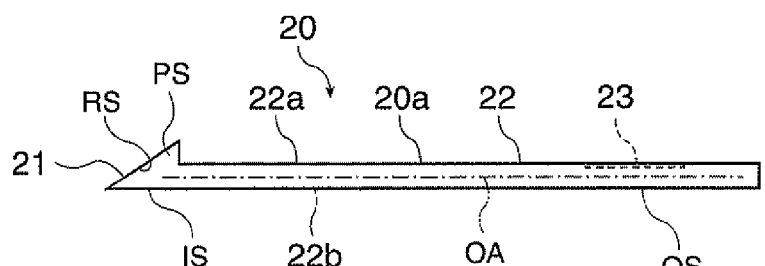
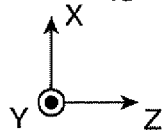
FIG. 1C

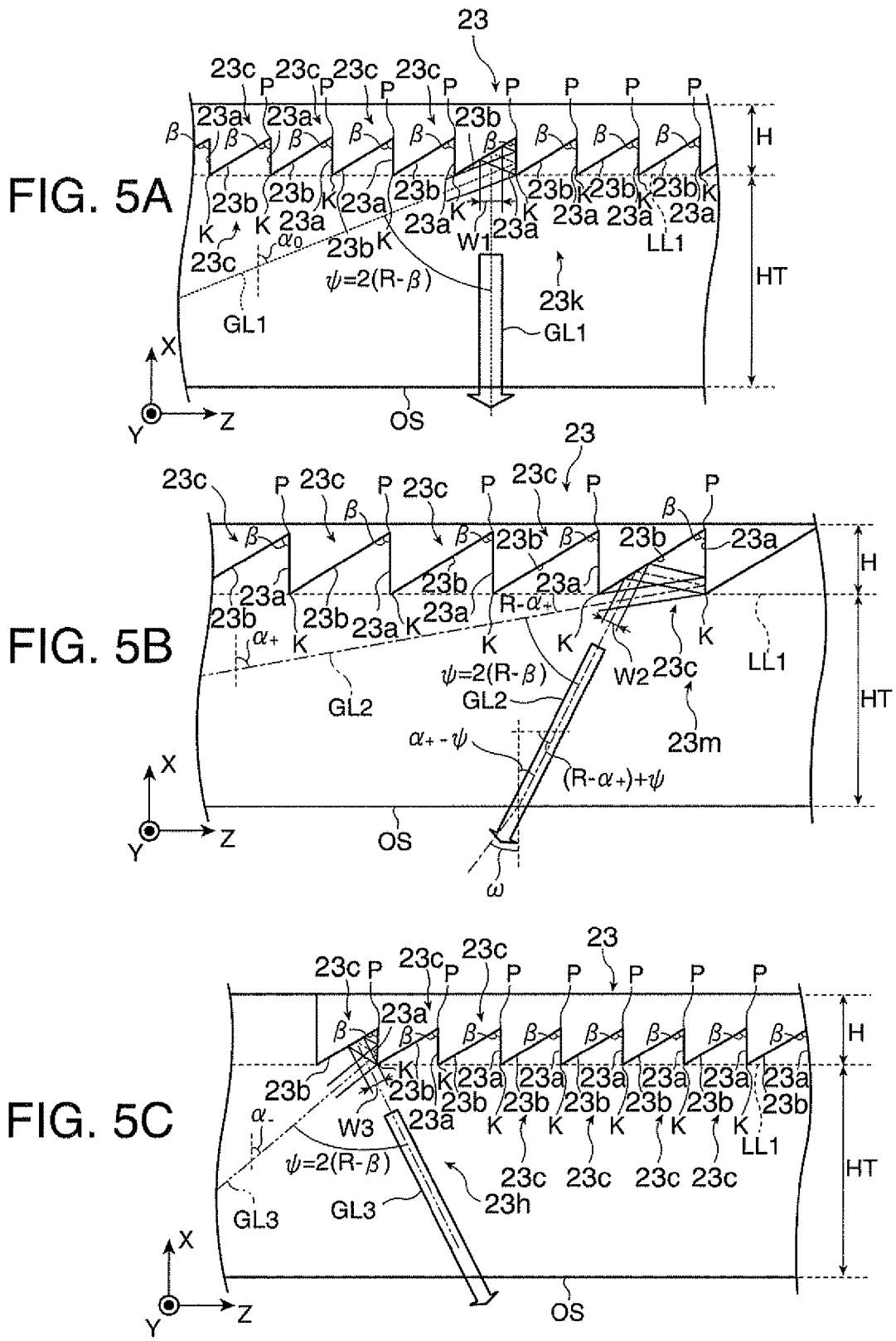

LIGHT GUIDE PLATE AND VIRTUAL IMAGE DISPLAY DEVICE EQUIPPED WITH THE SAME

BACKGROUND

1. Technical Field

The present invention relates to a light guide plate used for a head-mount display or the like used while worn on the head, and a virtual image display device incorporating the light guide plate.

2. Related Art

In recent years, as a virtual image display device such as a head-mount display for making formation and observation of a virtual image possible, there have been proposed various devices of a type of guiding the picture light from the display element to the pupils of the observer using a light guide plate. As such a light guide plate for a virtual image display device, there has been known a light guide plate, which guides the picture light using total reflection, reflects the picture light with a plurality of partial reflecting surfaces disposed in parallel to each other at a predetermined angle with a principal surface of the light guide plate, and thus outputs the picture light to thereby make the picture light reach the retinas of the observer (see JP-T-2003-536102 (the term "JP-T" as used herein means a published Japanese translation of a PCT patent application) and JP-A-2004-157520). The plurality of partial reflecting surfaces provided to the light guide plate can be made as what is obtained by providing a reflecting layer to the part having, for example, a sawtooth cross-sectional shape (see, e.g., JP-A-2004-157520, FIG. 5).

In the case of taking out the light beam from the light guide plate provided with the plurality of partial reflecting surfaces parallel to each other as described above, since there occurs the difference in the width of the light beam which can be taken therefrom between the partial reflecting surfaces disposed along the light guide direction of the light guide plate due to the difference in the total reflection angle inside the light guide plate between the light beams, there is a possibility that the resolution of the image is degraded locally.

SUMMARY

An advantage of some aspects of the invention is to provide a light guide plate for a virtual image display device capable of preventing the local degradation of the resolution, and a virtual image display device incorporating the light guide plate.

A light guide plate according to one aspect of the invention includes (a) a light entrance section adapted to take in an image light inside, (b) a light guide section having first and second total reflection surfaces extending so as to be opposed to each other, and adapted to guide the image light taken in from the light entrance section by total reflection on the first and second total reflection surfaces, (c) an image take-out section having a plurality of reflecting units arranged in a predetermined arranging direction, and adapted to make it possible to take out the image light, which enters via the light guide section, to an outside by bend of a light path in the plurality of reflecting units, and (d) a light emission section adapted to emit the image light, which passes through the image take-out section, to the outside, and (e) shapes of reflecting surfaces of the plurality of reflecting units vary along the predetermined arranging direction in the image take-out section in accordance with a value of a total reflection angle of the image light, which is bent by the plurality of reflecting units, in the light guide section so as to prevent degradation of resolution of the image light. Here, the total reflection includes not only the case in which whole light is reflected on the inside surface and is transmitted, but also the case of performing the reflection by providing the mirror coat or a half-mirror film formed of a semi-transparent aluminum film on the surface fulfilling the total reflection condition. Further, the light emission section denotes a light emission surface or a part including the light emission surface for emitting the image light, the light path of which is bent by the image take-out section, to the outside of the light guide plate. Further, the variation in the shape of the reflecting surface of the plurality of reflecting units includes difference in size between the plurality of reflecting units.

In the guiding plate, since the shapes of the reflecting surfaces of the reflecting units vary in the image take-out section in accordance with the state of the total reflection angle in the light guide section so as to prevent the degradation of the resolution, it is possible to prevent the resolution from being excessively degraded by adjustment of the shape of the reflecting surface such as varying of the size in each of the reflecting units. In particular, in the case of varying the size of the reflecting unit along the arranging direction, the effective light beam width as the light beam width of an effective component, which can finally be recognized by the observer, out of the image light can be kept sufficiently large while being premised on the diffusion or the dispersion on the reflecting surface. Therefore, the deterioration in the image light caused by the reflection in a specific reflecting unit can be avoided, and as a result, the local degradation of the resolution of the image due to the virtual image light thus emitted can surely be prevented.

In a specific aspect of the invention, the image take-out section has a first reflecting unit adapted to perform the bend of the light path on the image light having a relatively large total reflection angle, and a second reflecting unit adapted to perform the bend of the light path on the image light having a relatively small total reflection angle, and a reflecting surface of the first reflecting unit is larger than a reflecting surface of the second reflecting unit. In this case, with respect to the image light having the relatively large total reflection angle difficult to assure the effective light beam width, by setting the reflecting surface of the first reflecting unit corresponding to such an image light to be relatively large, the sufficient effective light beam width can be assured.

In another aspect of the invention, assuming that incident angles of light beams of the image light each entering either one of the plurality of reflecting units of the image take-out section at respective angles different from each other are respectively $\alpha_1$, $\alpha_2$, and pitches of the reflecting units, which the light beams of the image light enter, are respectively $d_1$, $d_2$, $d_1 \leq d_2$ is true if $\alpha_1 < \alpha_2$, is true. In this case, since the reflecting units have the pitches corresponding to the variation in the incident angle of the light beam input thereto, the effective light beam width of each of the image lights can be assured.

In another aspect of the invention, each reflecting unit constituting the plurality of reflecting units is mainly composed of a first reflecting surface and a second reflecting surface forming a predetermined angle with the first reflecting surface, and reflects the image light, which is guided by the light guide section, by the first reflecting surface, and further reflects the image light, which is reflected by the first reflecting surface, by the second reflecting surface to thereby perform the bend of the light path. In this case, the take out of the image light becomes possible due to the two-step reflection in the first reflecting surface and the second reflecting surface.

In another aspect of the invention, a size of the reflecting unit located on an anti-light entrance section side distant from the light entrance section out of the plurality of reflecting units is larger than a size of the reflecting unit located on the light entrance section side. In this case, due to the difference in size between the reflecting units, it is possible to make the effective light beam width of the light beam taken out from the reflecting unit located on the anti-light entrance section side equal or approximate to the effective light beam width of the light beam taken out from the reflecting unit located light entrance section side.

In another aspect of the invention, a pitch of the reflecting units located on an anti-light entrance section side distant from the light entrance section out of the plurality of reflecting units is larger than a pitch of the reflecting units located on the light entrance section side. In this case, by adjusting the pitch of the reflecting units, it is possible to make the effective light beam width of the light beam taken out from the reflecting unit located on the anti-light entrance section side equal or approximate to the effective light beam width of the light beam taken out from the reflecting unit located light entrance section side.

In another aspect of the invention, a distance from a light emission surface of the light emission section to an emission side end as a tip of the reflecting unit of the image take-out section with respect to an emission direction of the image light bent is constant. In this case, by selecting the size or the pitch of the reflecting units, the width for taking in the image light in the reflecting units can be determined.

In another aspect of the invention, the larger the size of the reflecting unit of the plurality of reflecting units is, the closer to the light emission section the emission side end as a tip of the reflecting unit with respect to an emission direction of the image light bent comes, and the plurality of reflecting units projects toward the light emission section side in accordance with the size of the reflecting unit with respect to the predetermined arranging direction. In this case, the larger the size of the reflecting unit is, the more efficiently the image light can be taken in.

In another aspect of the invention, sizes of the plurality of reflecting units vary so as to keep an effective light beam width of the image light entering each of the reflecting units in a value larger than a predetermined value. In this case, by increasing the effective light beam width of the image light in each of the reflecting units to the extent that the turbulence in the light beam does not become significant, the image light entering the image take-out section can be reflected while keeping the resolution of the entire image light in a level higher than a certain level.

In another aspect of the invention, pitches of the plurality of reflecting units vary in a range of 0.5 mm through 1.3 mm. In this case, by setting the pitches to be not smaller than 0.5 mm, the turbulence in the light beam due to the dispersion or diffraction can be reduced, and by setting the pitches to be not higher than 1.3 mm, it is possible to prevent the cross stripes caused by the reflecting units from becoming conspicuous to the observer.

A virtual image display device according to one aspect of the invention includes (a) the light guide plate according to any one of the aspects of the invention described above, and (b) an image forming device adapted to form the image light to be guided by the light guide plate. In this case, by using the light guide plate described any one of the aspects of the invention described above, the virtual image display device can emit the high-resolution virtual image light.

BRIEF DESCRIPTION OF THE DRAWINGS

The invention will be described with reference to the accompanying drawings, wherein like numbers reference like elements.

FIG. 1A is a cross-sectional view showing a virtual image display device according to a first embodiment of the invention, and FIGS. 1B and 1C are a front view and a plan view, respectively, of a light guide plate according to the first embodiment.

FIG. 5A is a cross-sectional view for explaining the structure of a central part of an image take-out section in the light guide plate of the modified example, FIG. 5B is a cross-sectional view for explaining the structure of a back-side part of the image take-out section, and FIG. 5C is a cross-sectional view for explaining the structure of an entrance-side part of the image take-out section.

DESCRIPTION OF EXEMPLARY EMBODIMENTS

First Embodiment

Figure 2A:
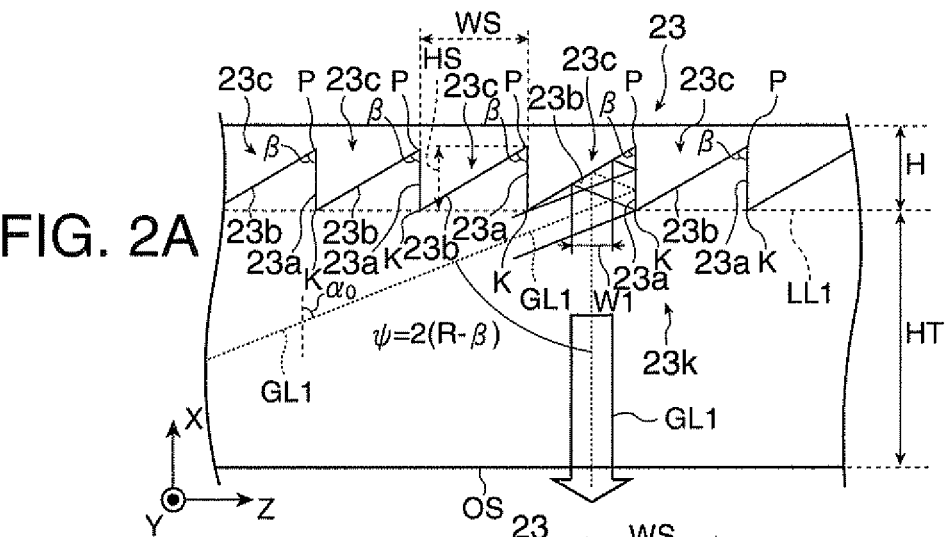
FIG. 2A is a cross-sectional view for explaining the structure of a central part of an image take-out section in the light guide plate.

Hereinafter, a light guide plate for a virtual image display device and a virtual image display device incorporating the light guide plate according to a first embodiment of the invention will be explained with reference to the accompanying drawings.

A. Structure of Light Guide Plate and Virtual Image Display Device

A virtual image display device 100 according to the present embodiment shown in FIG. 1A is to be applied to a head-mount display, and is provided with an image forming device 10 and a light guide plate 20 making a set. It should be noted that FIG. 1A corresponds to the A-A cross section of the light guide plate 20 shown in FIG. 1B.

The virtual image display device 100 is for making the observer recognize the image light of the virtual image, and at the same time, making the observer observe the external image in a see-through manner. Although the image forming device 10 and the light guide plate 20 are normally provided as a set to each of the right and left eyes of the observer, the set for the right eye and the set for the left eye are bilaterally symmetrical to each other, and therefore, only the set for the left eye is shown here, and the set for the right eye is omitted from the drawings. It should be noted that the virtual image display device 100 is arranged to have an appearance (not shown) similar to, for example, typical spectacles as a whole.

As shown in FIG. 1A, the image forming device 10 has a liquid crystal device 11 and a projection optical system 12. Among these constituents, the liquid crystal device 11 has an illumination device 31 for emitting two-dimensional illumination light, a liquid crystal display device 32 as a transmissive light modulation device, and an emission angle adjustment member 33 disposed between these devices. The liquid crystal display device 32 spatially modulates the illumination light from the illumination device 31 to thereby form the image light to be the display object such as a moving image. The projection optical system 12 is a collimating lens for converting the image light emitted from each point on the liquid crystal display device 32 into a light beam in a collimated state. The emission angle adjustment member 33 changes the emission angle distribution of the illumination light in accordance with the positions in the screen, and adjusts it so that the image light emitted from the liquid crystal display device 32 enters the eyes EY of the observer as a result.

As shown in FIGS. 1A through 1C, the light guide plate 20 is provided with a light guide plate main body 20a, an incident light bending section 21, and an image take-out section 23 as an angle conversion section. The light guide plate 20 is for emitting the image light formed by the image forming device 10 toward the eyes EY of the observer as the virtual image light to thereby make the observer recognize it as an image.

The overall appearance of the light guide plate 20 is formed by the light guide plate main body 20a, which is a flat plate extending in parallel to the Y-Z plane in the drawings. Further, the light guide plate 20 has a structure having the image take-out section 23, which is composed of a number of minute mirrors embedded in the light guide plate main body 20a, at one end in the longitudinal direction, and a prism section PS, which is formed so as to extend the light guide plate main body 20a, and the incident light bending section 21 attached thereto at the other end in the longitudinal direction.

The light guide plate main body 20a is made of a light transmissive resin material or the like, and has a light entrance surface IS as a light entrance section for taking in the image light from the image forming device 10 and a light emission surface OS as a light emission section for emitting the image light toward the eyes EY of the observer on the obverse side plane thereof parallel to the Y-Z plane and opposed to the image forming device 10. The light guide plate main body 20a has a rectangular tilted surface RS in addition to the light entrance surface IS as a side surface of the prism section PS, and on the tilted surface RS, there is formed a mirror layer 21a so as to cover the tilted surface RS. Here, the mirror layer 21a cooperates with the tilted surface RS to thereby function as the incident light bending section 21 disposed in a state tilted with respect to the light entrance surface IS. Further, in the light guide plate main body 20a, there is formed the image take-out section 23 as a minute structure along the plane on the reverse side of the light emission surface OS.

The incident light bending section 21 as a mirror layer 21a, which is disposed so as to face the light entrance surface IS of the light guide plate main body 20a in a tilted manner, is formed by performing deposition such as aluminum vapor deposition on the tilted surface RS described above of the light guide plate main body 20a, and functions as a reflecting surface for reflecting the incident light to deflect the light path thereof in a predetermined direction approximate to an orthogonal direction. Therefore, the incident light bending section 21 bends the image light, which enters the light entrance surface IS and proceeds in the +X direction as a whole, so as to proceed in the +Z direction deflected to the –X direction as a whole to thereby surely combine the image light within the light guide plate main body 20a.

Further, the light guide plate main body 20a has a light guide section 22, which guides the image light input inside via the incident light bending section 21 to the image take-out section 23, through the area from the incident light bending section 21 on the entrance side to the image take-out section 23 on the back side.

The light guide section 22 has a first total reflection surface 22a and a second total reflection surface 22b each for totally reflecting the image light bent by the incident light bending section 21 as a pair of planes, which are the principal surfaces of the light guide plate main body 20a shaped like a flat plate, opposed to each other, and extend in parallel to the Y-Z plane. It is assumed here that the first total reflection surface 22a is located on the reverse side far from the image forming device 10, and the second total reflection surface 22b is located on the obverse side near to the image forming device 10. In this case, the second total reflection surface 22b forms a surface part common to the light entrance surface IS and the light emission surface OS. The image light reflected on the incident light bending section 21 firstly enters the second total reflection surface 22b and is then totally reflected. Subsequently, the image light enters the first total reflection surface 22a, and is then totally reflected. By subsequently repeating the actions described above, the image light is guided to the back side of the light guide plate 20, namely the +Z side where the image take-out section 23 is disposed. It is assumed here that the transparent resin material used for the light guide plate main body 20a is a high-refractive index material having a refractive index n, for example, equal to or higher than 1.5. By using the transparent resin material having a relatively high refractive index for the light guide plate 20, it becomes easy for the light guide plate 20 to guide the image light inside the light guide plate 20, and it becomes possible to set the field angle of the image light inside the light guide plate 20 to be relatively small.

The image take-out section 23 disposed so as to face the light emission surface OS of the light guide plate main body 20a is formed roughly along an extended plane of the first total reflection surface 22a and close to the extended plane in the back side (the +Z side) of the light guide section 22. The image take-out section 23 reflects the image light, which is input thereto via the first and second total reflection surfaces 22a, 22b of the light guide section 22, at a predetermined angle to thereby bend it toward the light emission surface OS. In other words, the image take-out section 23 functions as an angle conversion section for converting the angle of the image light. It is assumed here that the image light entering first the image take-out section 23 is the take-out object as the virtual image light. Details of the structure of the image take-out section 23 will be described later with reference to FIG. 2A and so on.

B. Light Path of Image Light

The light path of the image light will hereinafter be explained in detail. As shown in FIG. 1A, it is assumed that the component emitted from the center portion of the emission surface 32a illustrated with the dotted line in the drawing out of the image light respectively emitted from the emission surface 32a of the liquid crystal display device 32 of the liquid crystal device 11 is image light GL1, the component emitted from the left side (the –Z side) of the sheet out of the periphery of the emission surface 32a illustrated with the dashed-dotted line in the drawing is image light GL2, and the component emitted from the right side (the +Z side) of the sheet out of the periphery of the emission surface 32a illustrated with the dashed-two dotted line in the drawing is image light GL3.

The principal components of the respective image lights GL1, GL2, and GL3 passing through the projection optical system 12 enter the light entrance surface IS of the light guide plate 20, and then repeat the total reflection on the first and second total reflection surfaces 22a, 22b at respective angles different from each other. Specifically, among the image lights GL1, GL2, and GL3, the image light GL1 emitted from the center portion of the emission surface 32a of the liquid crystal device 11 is reflected at the incident light bending section 21 as a parallel light beam, then enters the second total reflection surface 22b of the light guide section 22 at a standard reflection angle $\alpha_0$, and is then totally reflected. Subsequently, the image light GL1 repeats the total reflection on the first and second total reflection surfaces 22a, 22b in a condition of keeping the standard reflection angle $\alpha_0$. The image light GL1 is totally reflected by the first and second total reflection surfaces 22a, 22b N times (N denotes a natural number), and then enters the center portion 23k of the image take-out section 23. In other words, the standard reflection angle $\alpha_0$ determines the incident angle of the image light GL1 to the image take-out section 23. The image light GL1 is reflected at the center portion 23k at a predetermined angle, and is then emitted from the light emission surface OS in the direction of the optical axis AX perpendicular to the Y-Z plane including the light emission surface OS as a parallel light beam. The image light GL2 emitted from one end (the −Z side) of the emission surface 32a of the liquid crystal device 11 is reflected by the incident light bending section 21 as a parallel light beam, and then enters the second total reflection surface 22b of the light guide section 22 at the maximum reflection angle $\alpha_+$, and is then totally reflected. The image light GL2 is totally reflected on the first and second total reflection surfaces 22a, 22b, for example, N−M times (M denotes a natural number), then reflected in the peripheral portion 23m on an anti-light entrance surface side (the +Z side) of the image take-out section 23 at a predetermined angle, and is then emitted from the light emission surface OS toward the predetermined angle direction as a parallel light beam. The emission direction on this occasion is arranged so that the light is returned toward the incident light bending section 21, and forms an obtuse angle with the +Z axis. The image light GL3 emitted from the other end (the +Z side) of the emission surface 32a of the liquid crystal device 11 is reflected by the incident light bending section 21 as a parallel light beam, and then enters the second total reflection surface 22b of the light guide section 22 at the minimum reflection angle $\alpha_−$, and is then totally reflected. The image light GL3 is totally reflected on the first and second total reflection surfaces 22a, 22b, for example, N+M times, then reflected in the peripheral portion 23h on the side (the −Z side) nearest to the light entrance surface out of the image take-out section 23 at a predetermined angle, and is then emitted from the light emission surface OS toward the predetermined angle direction as a parallel light beam. The emission direction on this occasion is arranged so that the light gets away from the incident light bending section 21, and forms an acute angle with the +Z axis.

It should be noted that since the reflection efficiency of the light by the total reflection on the first and second total reflection surfaces 22a, 22b is extremely high, even if the number of times of reflection is different between the image lights GL1, GL2, and GL3 as described above, the brightness degradation is hardly caused by the difference in the number of times of reflection described above. It should be noted that the image light GLy as the image light viewed with respect to the vertical direction, namely the Y direction passes through the light guide plate 20 so as to converge as a whole as shown in FIG. 1B.

C. Structure of Image Take-Out Section and Bend of Light Path by Image Take-Out Section The structure of the image take-out section 23 and the bend of the light path of the image light by the image take-out section 23 will hereinafter be explained in detail with reference to FIGS. 2A through 2C. It should be noted that FIGS. 2A through 2C are schematic diagrams showing the central portion 23k and peripheral portions 23m, 23h of the image take-out section 23 shown in FIG. 1A, respectively, in an enlarged manner.

Firstly, the structure of the image take-out section 23 will be explained. The image take-out section 23 is composed of a number of linear reflecting units 23c arranged in a stripe manner. In other words, the image take-out section 23 is configured by arranging a number of elongated reflecting units 23c, which extend in the Y direction, in a first direction in which the light guide section 22 extends, namely the Z direction. Each of the reflecting units 23c has a first reflecting surface 23a as one reflecting surface component disposed on the back side, namely the +Z side, and a second reflecting surface 23b as another reflecting surface component disposed on the entrance side, namely the −Z side as a set of reflecting surfaces. Among these reflecting surfaces, at least the second reflecting surface 23b is a partial reflecting surface capable of transmitting some of the light, and enables the observer to observe the external image in a see-through manner. Further, each of the reflecting units 23c has a V shape or a wedge shape in the X-Z cross-sectional view with the first and second reflecting surfaces 23a, 23b adjacent to each other. More specifically, the first and second reflecting surfaces 23a, 23b extend linearly taking the direction, which is parallel to the first total reflection surface 22a shown in, for example, FIG. 1A, and extends perpendicularly to the Z direction, the arranging direction in which the reflecting units 23c are arranged, namely the Y direction, as the longitudinal direction. Further, the first and second reflecting surfaces 23a, 23b are tilted around the longitudinal direction at respective angles with the first total reflection surface 22a different from each other (i.e., respective angles with the Y-Z plane different from each other). As a result, the first reflecting surfaces 23a are arranged periodically in a repeated manner, and extend in parallel to each other, and the second reflecting surfaces 23b are also arranged periodically in a repeated manner, and extend in parallel to each other. In the specific example shown in, for example, FIG. 2A, it is assumed that each of the first reflecting surfaces 23a extends along a direction (the X direction) roughly perpendicular to the first total reflection surface 22a. Further, each of the second reflecting surfaces 23b extends in a direction at a predetermined counterclockwise angle (the relative angle) β with the corresponding first reflecting surface 23a. It is assumed here that the relative angle β is set to, for example, 54.7° in the specific example.

It should be noted that although each of the first reflecting surfaces 23a is arranged to be the actual entrance surface of the image light, it is assumed in the present specification that the total reflection angle on the total reflection surfaces 22a, 22b of the image light, which enters the first and second reflecting surfaces 23a, 23b of each of the image lights via the total reflection surfaces 22a, 22b is referred to as an incident angle to the image take-out section 23, namely the incident angle to the reflecting unit 23c.

Figure 2B:
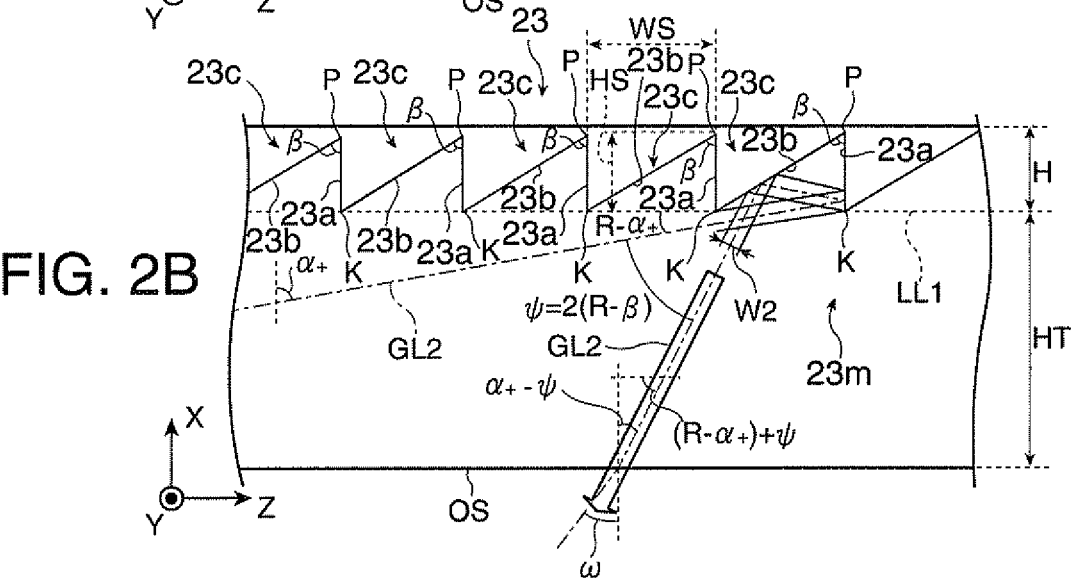
FIG. 2B is a cross-sectional view for explaining the structure of a back-side part of the image take-out section.
Figure 2C:
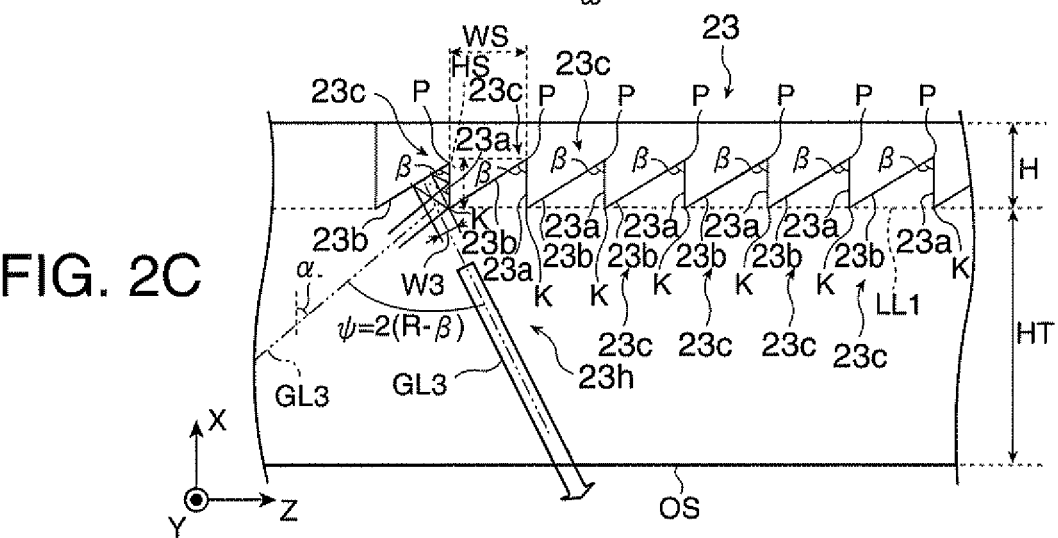
FIG. 2C is a cross-sectional view for explaining the structure of an entrance-side part of the image take-out section.

In the case of the present embodiment, as shown in FIGS. 2A through 2C, the sizes of each of the reflecting units 23c having cross-sectional shapes similar to each other, namely the vertical size HS as the vertical (the X direction) length of one of the reflecting units 23c illustrated with the broken lines in the drawing and the lateral size WS as the horizontal (the Z direction) length thereof, vary in the image take-out section 23 with respect to the arranging direction, namely the Z direction, in accordance with the total reflection angle of the image light, which is bent in the respective reflecting unit 23c, in the light guide section 22 (see, e.g., FIG. 1A), namely the incident angle to the reflecting unit 23c or the image take-out section 23. More specifically, firstly, the vertical and lateral sizes HS, WS of the reflecting unit 23c located on the central side, namely the central portion 23k side out of the number of reflecting units 23c constituting the image take-out section 23 are set to be middle so as to correspond to the image light GL1 entering at the incident angle $\alpha_0$ of an average dimension as shown in FIG. 2A. In contrast thereto, the vertical and lateral sizes HS, WS of the reflecting unit 23c located on the back side of the image take-out section 23, namely on the peripheral portion 23m side there of, are set to be large compared to the vertical and lateral sizes HS, WS of the reflecting unit 23c in the central portion shown in FIG. 2A so as to correspond to the image light GL2 entering at the relatively large incident angle $\alpha_+$ as shown in FIG. 2B. Further, the vertical and lateral sizes HS, WS of the reflecting unit 23c located on the entrance side of the image take-out section 23, namely on the peripheral portion 23h side there of, are set to be small compared to the vertical and lateral sizes HS, WS of the reflecting unit 23c in the central portion shown in FIG. 2A so as to correspond to the image light GL3 entering at the relatively small incident angle $\alpha_-$ as shown in FIG. 2C. As a result, the vertical and lateral sizes HS, WS of the reflecting unit 23c corresponding to the image light CL3 shown in FIG. 2C are respectively set to be smaller than the vertical and lateral sizes HS, WS of the reflecting unit 23c corresponding to the image light GL2 shown in FIG. 2B. According to the fact described above, it results that the reflecting surface of the first reflecting unit for the image light GL2 is larger than the reflecting surface of the second reflecting unit for the image light GL1 (GL3) in the image take-out section 23 when comparing the reflecting unit 23c (a first reflecting unit) for performing the bend of the light path on the image light GL2 having a relatively large total reflection angle and the reflecting unit 23c (a second reflecting unit) for performing the bend of the light path on the image lights GL1, GL3 having relatively small total reflection angles with each other. It should be noted that although in the case described above the sizes of each of the reflecting units 23c are represented by the vertical size HS and the lateral size WS, the cross-sectional shapes of the respective reflecting units 23c are similar to each other, and therefore, it is possible to use only the lateral width d (see FIG. 3), which is the width in the Z direction corresponding to the lateral size WS out of these sizes, as the reference of the sizes of each of the reflecting units 23c.

Figure 3:
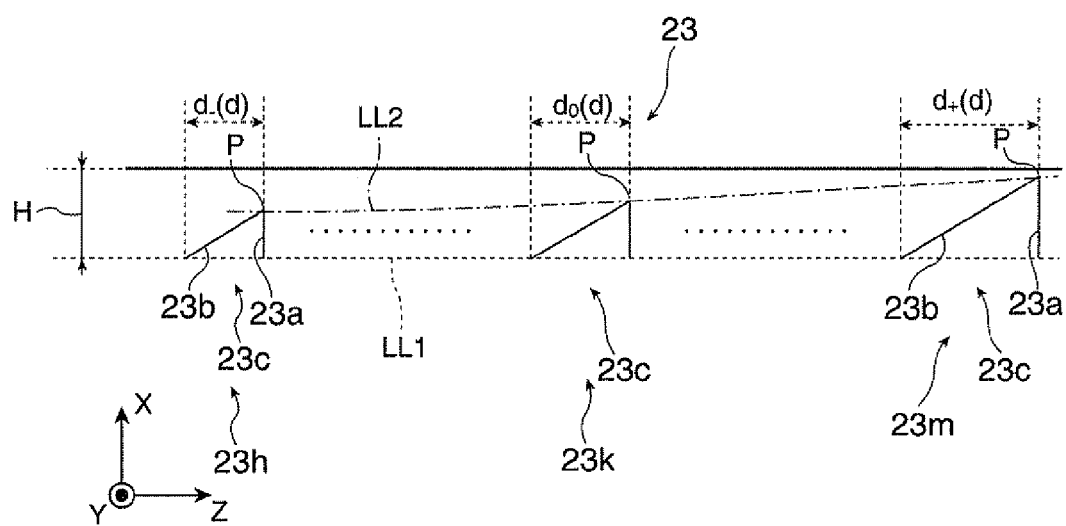
FIG. 3 is a diagram showing how a reflecting unit varies in the image take-out section.

Further, in the entire image take-out section 23, the number of reflecting units 23c similar to each other are formed so that the nearer to the entrance side of the image take-out section 23, namely the −Z side, the reflecting unit 23c is located, the smaller the reflecting unit 23c is, and the further the location of the reflecting unit 23c proceeds toward the back side, namely the +Z side, the larger the reflecting unit 23c becomes, and the curve LL2 formed by connecting the apexes P of the respective reflecting units 23c is tilted so as to increase in the depth direction, namely the X direction, as the location moves toward the +Z side as schematically shown in FIG. 3.

Here, the lateral width d defining the size of the reflecting unit 23c can be thought to be the pitch of the reflecting units 23c with respect to the arranging direction of the reflecting units 23c, namely the Z direction. Specifically, if it is defined in FIG. 3 that the lateral width $d_0$ of the reflecting unit 23c located in the central portion with respect to the Z direction out of the reflecting units 23c is a standard pitch $d_0$, the lateral width d of each of the reflecting units 23c, namely the pitch d, gradually increases ($d_+ > d_0$) toward the +Z side, and gradually decreases ($d_- < d_0$) toward the −Z side with respect to the standard pitch $d_0$. Further, in other words, since the size or the pitch of the plurality of reflecting units 23c increases monotonically toward the +Z side, the size or the pitch of the reflecting units 23c located on the anti-light entrance surface side the most distant from the light entrance surface IS (see FIG. 1A), namely the back side, out of the plurality of reflecting units 23c is arranged to be larger than the size or the pitch of the reflecting units 23c located nearest to the light entrance surface, namely on the entrance side. By adjusting the size or the pitch of the reflecting units 23c, it is possible to make the effective light beam widths of the respective image lights entering the respective reflecting units 23c equal or approximate to each other.

Going back to FIGS. 2A through 2C, the image take-out section 23 has a constant thickness H with respect to the depth direction, namely the X direction. In other words, the line LL1 connecting apexes K, each of which is a boundary portion between the reflecting units 23c constituting the image take-out section 23, and is the tip of the reflecting unit 23c of the image take-out section 23, namely the emission side end with respect to the emission direction of the image light GL1 and so on bent by the image take-out section 23, is arranged to be parallel to the light emission surface OS. Therefore, the distance HT from the light emission surface OS to the apex K of the second reflecting surface 23b with respect to the thickness direction (the X direction) of the light guide plate 20 becomes constant, and it is possible to accurately define the width, with which each of the reflecting units 23c can take in the image light, in accordance with the size of each of the reflecting units 23c.

The bend of the light path of the image light by the image take-out section 23 will hereinafter be explained in detail. Firstly, as shown in FIG. 2A, the image light GL1 guided with the middle incident angle $\alpha_0$ to be the standard among the image lights enters one of the reflecting units 23c disposed in the central portion 23k on the central side in the image take-out section 23, then reflected first by the first reflecting surface 23a on the anti-light entrance surface side, namely the +Z side, and then reflected by the second reflecting surface 23b on the light entrance side, namely the −Z side. The image light GL1 passing through the reflecting unit 23c is emitted from the light emission surface OS without passing through any other reflecting units 23c. In other words, the image light GL1 is bent to have a desired angle with only a single passage in the image take-out section 23, and is then taken out to the observer side.

Further, as shown in FIG. 2B, the image light GL2 guided with the largest angle $\alpha_+$ of the incident angles enters one of the reflecting units 23c disposed in the peripheral portion 23m on the anti-light entrance surface side, namely the +Z side, the furthest of the image take-out section 23 from the light entrance surface IS (see FIG. 1A), then reflected first by the first reflecting surface 23a on the anti-light entrance surface side, namely the +Z side, and then reflected by the second reflecting surface 23b on the light entrance side, namely the −Z side similarly to the case of the image light GL1 shown in FIG. 2A. The image light GL2 passing through the reflecting unit 23c is emitted from the light emission surface OS without passing through any other reflecting units 23c. In other words, the image light GL2 is bent to have a desired angle with only a single passage in the image take-out section 23, and is then taken out to the observer side.

Further, as shown in FIG. 2C, the image light GL3 guided with the smallest angle $\alpha_-$ of the incident angles enters one of the reflecting units 230 disposed in the peripheral portion 23h on the light entrance surface side, namely the −Z side, the nearest of the image take-out section 23, then reflected first by the first reflecting surface 23a on the anti-light entrance surface side, namely the +Z side, and then reflected by the second reflecting surface 23b on the light entrance side, namely the −Z side similarly to the case of the image light GL1 shown in FIG. 2A and so on. The image light GL3 passing through the reflecting unit 23c is bent to have a desired angle with only a single passage in the image take-out section 23, and is then taken out to the observer side without passing through any other reflecting units 23c.

In the case of the two-stage reflection in the first and second reflecting surfaces 23a, 23b described above, the bend angle ψ as the angle formed between the direction in which each of the image lights is input and the direction in which each of the image lights is output is obtained as ψ=2(R−β) (R denotes the right angle) in either case as shown in FIGS. 2A through 2C. In other words, the bend angle ψ is constant irrespective of, for example, the value of the incident angle with respect to the image take-out section 23, namely the reflection angles $\alpha_0$, $\alpha_+$, $\alpha_-$ as the total reflection angles of the respective image light. Thus, as described above, even in the case in which the component with a relatively large total reflection angle out of the image light is made to enter the peripheral portion 23m side on the +Z side out of the image take-out section 23, and the component with a relatively small total reflection angle is made to enter the peripheral part 23h side on the −Z side out of the image take-out section 23, it becomes possible to efficiently take out the image light in the angle condition in which the image light is collected to the eyes EY of the observer as a whole. Since the configuration of taking out the image light with such an angular relationship is adopted, the light guide plate 20 can make the image light pass through the image take-out section 23 only once instead of two or more times, thus making it possible to take out the image light as the virtual image light with slight loss.

It should be noted that by arbitrarily adjusting the angles or the like, with which the image lights GL1, GL2, GL3 and so on are guided, in the optical design of the shape and the refractive index of the light guide section 22, and the reflecting units 23c constituting the image take out section 23, it is possible to make the image light, which is emitted from the light emission surface OS, enter the eyes EY of the observer as the virtual image light in the condition of keeping the symmetrical property as a whole taking the basic image light GL1, namely the optical axis AX, as the point of symmetry. In other words, the angle $\theta_2$ of the image light GL2 on one end with respect to the X direction or the optical axis AX and the angle $\theta_3$ of the image light GL3 on the other end with respect to the X direction or the optical axis AX are roughly the same in amount and opposite to each other in direction. It should be noted that the angles $\theta_2$, $\theta_3$ of the respective image light GL2, GL3 are arranged to be relatively approximate to the perpendicular with respect to the light emission surface OS or the second total reflection surface 22b, and therefore, the image lights GL2, GL3 pass through the light emission surface OS with a sufficient transmittance. Further, although it is necessary to take the refraction when passing through the light emission surface OS or the second total reflection surface 22b into consideration in a strict sense, the angles $\theta_2$, $\theta_3$ are arranged to correspond to the field angle of the virtual image due to the image light emitted from the image forming device 10.

D. Effective Light Beam Width of Image Light

Figure 4A:
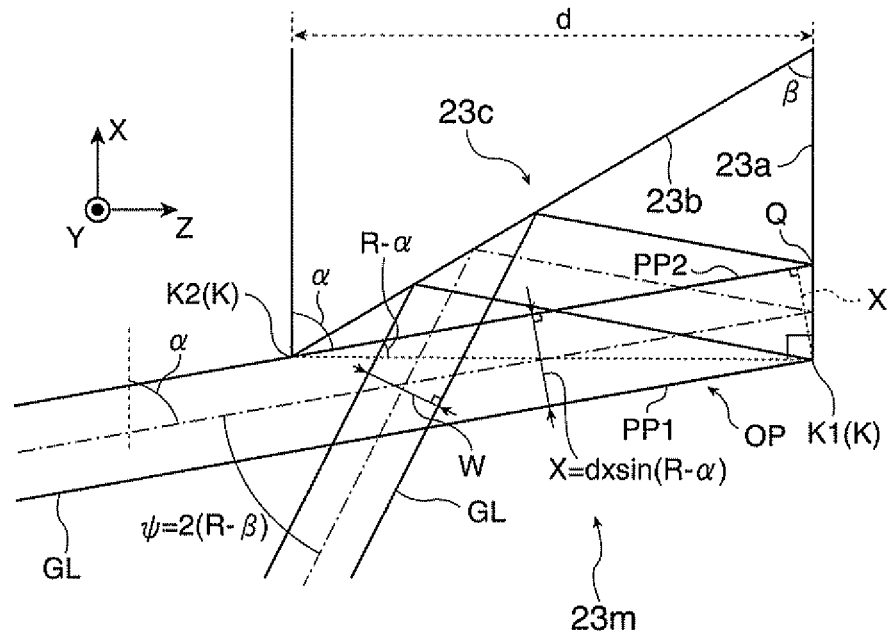
FIG. 4A is a diagram for explaining an effective light beam width in the reflecting unit.

Hereinafter, the principle of keeping the effective light beam width of the image light taken out in the image take-out section 23, namely the reflecting unit 23c to thereby prevent the local degradation of resolution of the image light will be explained with reference to FIG. 4A and so on. FIG. 4A is for showing the reflecting unit 23c for reflecting the image light GL with a relatively large incident angle as an example, and is an enlarged view of one located on the peripheral portion 23m side, which is the back side of the image take-out section 23, namely the +Z side. The degradation of the resolution in the take-out of the image light in the image take-out section 23 is caused by the mirror accuracy such as a defect by a scratch on the first and second reflecting surfaces 23a, 23b. Therefore, if the effective light beam width W of the image light finally taken out in each of the reflecting units 23c is kept larger than a certain level, the degradation of the resolution is prevented. However, in particular in the reflecting unit 23c located on the peripheral portion 23m side shown in FIG. 4A, the incident light beam width X when inputting the image light GL is limited and apt to be reduced, and therefore, it is not necessarily easy to keep the value of the effective light beam width W. In other words, it becomes an important issue for preventing the local degradation of the resolution to surely keep the incident light beam width X of the image light GL. It should be noted that the image light GL entering the reflecting unit 23c with the incident light beam width X is emitted while keeping the width as a light with the effective light beam width W in the first and second reflecting surfaces 23a, 23b as shown in the drawings.

Here, the value of the incident light beam width X is determined by the incident angle α, and the lateral width d representing the dimension of the opening OP of the reflecting unit 23c, namely the size of the reflecting unit 23c. In more specific explanation, denoting the apexes K located on the back side and the entrance side out of the apexes K as the both ends of the opening OP as apexes K1, K2, respectively, it results that the image light GL is taken in in a range from the component passing through the apex K1 to the component passing through the apex K2. Specifically, the width from the line PP1 indicating the component passing through the apex K1 to the line PP2 indicating the component passing through the apex K2 corresponds to the incident light beam width X of the image light GL. Further, assuming here that the foot of the line drawn from the apex K1 to the line PP2 is an intersection point Q, the incident light beam width X is obtained from the right triangle composed of the apexes K1, K2, and the intersection point Q as follows.

$$X = d \times \sin(R - \alpha) \quad (1)$$

Therefore, in the case in which the incident angle α becomes large as in the case of the reflecting unit 23c on the peripheral portion 23m side, it is necessary to increase the lateral width d in accordance with the formula 1 described above in order for keeping the value of the incident light beam width X in a rather large value. In the present embodiment, as shown in, for example, FIG. 3, the size or the pitch of the reflecting units 23c is varied in accordance with the incident angle of the image light input thereto, namely the total reflection angle, and in particular by arranging that the larger the incident angle of the image light is, the larger the size or the pitch is set, the incident light beam width can be made sufficiently large with respect to the image light entering any of the reflecting units 23c.

Figure 4B:
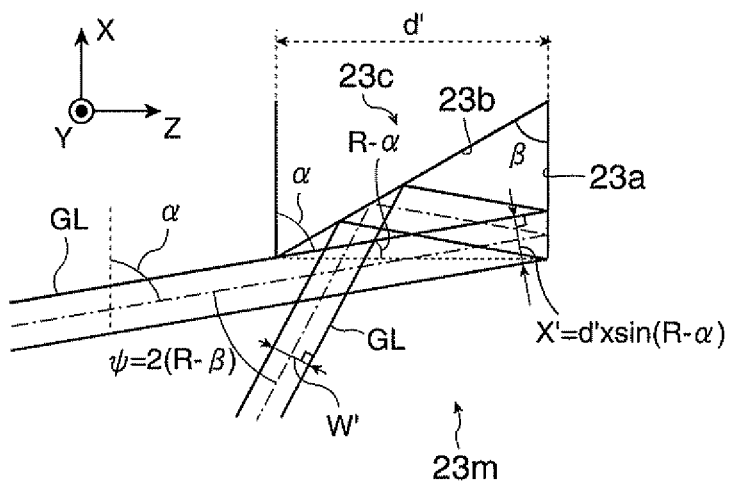
FIG. 4B is a diagram of a comparative example.

For example, as shown in FIG. 4B as a comparative example, if the lateral width of the reflecting unit 23c on the peripheral portion 23m side has the same size (i.e., the lateral width d' shown in FIG. 4B is kept in a small size) as that of the lateral width of the reflecting unit 23c (see, e.g., FIG. 2C) on the peripheral portion 23h side despite the image light GL having a relatively large incident angle α is input on the peripheral portion 23m side, the incident light beam width X' of the light which can be taken in in the reflecting unit 23c on the peripheral portion 23m side is reduced, and as a result, the effective light beam width W' of the light which is taken out is also reduced, and there is a possibility that the resolution of the image light GL is degraded in the reflection on the first and second reflecting surfaces 23a, 23b. In contrast thereto, in the present embodiment, it is possible to prevent the degradation (local degradation) of the resolution apt to occur in the reflection particularly in the reflecting unit 23c on the pack side out of the image take-out section 23 by appropriately increasing the value of the lateral width d taking the formula 1 described above into consideration on the back side of the image take-out section 23 where the effective light beam width W of the image light GL is difficult to be kept as represented by the reflecting unit 23c located on the peripheral portion 23m side shown in, for example, FIG. 4A.

Here, in order for considering the effective light beam width W2 of the image light GL2, which is the most difficult to keep of the effective light beam widths shown in FIG. 2B, it is assumed firstly that the refractive index of the light guide plate 20 is nd, and the maximum field angle of the image to be recognized by the observer is ω. In this case, the relationship between the incident angle $\alpha_+$ and the angle ψ corresponding to the image light GL2 is expressed as follows from the relationship of the angles shown in FIG. 2B.

$$\sin(\alpha_+ - \psi) \times nd = \sin \omega$$

Therefore, the incident angle $\alpha_+$ is expressed as follows.

$$\alpha_+ = \psi + \sin^{-1}(\sin\omega/nd) \quad (2)$$
$$= 2 \times (R - \beta) + \sin^{-1}(\sin\omega/nd)$$

Therefore, assuming that, as an example, nd=1.5, ω=15°, and β=54.7°, the reflection angle is obtained as $\alpha_+ \approx 80°$. In accordance with this value, the value of the lateral width $d_+$ for keeping the incident light beam width X of the image light GL2, namely the effective light beam width W, in a value larger than a certain level can be calculated from the formula 1. In other words, the sufficient light beam width can be obtained with respect to the image light GL2 by appropriately setting the lateral width $d_+$ based on the relationship described above. As shown in, for example, FIGS. 2B and 2C, it is possible to keep the effective light beam width of the entire image light in a value larger than a certain level by adjusting the sizes of the corresponding reflecting units 23c so that the effective light beam width W2 of the image light GL2 as the ambient light and the effective light beam width W3 of the image light GL3 become in roughly the same level on the premise of the monotonic increase in size of the reflecting units 23c. Further, on this occasion, the lateral width d of the reflecting units 23c is varied in a specific numerical range of, for example, 0.2 mm or larger, or in a range of 0.5 mm through 1.3 mm as a more preferable example. By setting the lateral width d to the value within this range, it is possible to keep the effective light beam width of the image light to be taken out, and at the same time, to prevent the image light from being affected by the diffraction in the image take-out section 23, and prevent the cross stripes caused by the reflecting units 23c from becoming conspicuous to the observer.

According to the light guide plate 20 of the present embodiment explained hereinabove, as an example of the variation in the shape of the reflecting surface of the number of reflecting units 23c, the sizes of the respective reflecting units 23c vary in the image take-out section 23 along the Z direction in accordance with the state of the total reflection angle in the light guide section 22. Thus, it becomes possible to keep the sufficient effective light beam width of the image light input thereto in all of the reflecting units 23c. Therefore, the deterioration in the image light caused by the reflection in the reflecting units 23c can be avoided, and as a result, the degradation of the resolution of the image due to the virtual image light thus emitted can be prevented.

Further, although it is assumed in FIG. 3 that the curve LL2 formed by connecting the apexes P of the respective reflecting units 23c, namely the size of the respective reflecting units 23c, varies so as to monotonically increase toward the +Z side, it is possible for the curve LL2 to become, for example, a curve having a different shape or a straight line providing that the effective light beam width of the image light can be kept in a value larger than a certain level. In other words, the degree of the variation in size of the reflecting units 23c can appropriately be adjusted in accordance with the optical specifications of the virtual image display device 100.

Regarding the above, it is also possible to vary the plurality of reflecting units 23c of the image take-out section 23 as shown in FIGS. 5A through 5C as a modified example. Specifically, it is also possible to adopt a configuration in which the reflecting units 23c in the area from the peripheral portion 23h on the entrance side to the central portion 23k on the central side shown in FIGS. 5A and 5C have a roughly constant size while slightly increasing or decreasing the size toward the back side, and the reflecting units 23c in the area from the central portion 23k on the central side to the peripheral portion 23m on the back side shown in FIGS. 5A and 5B have sizes gradually increasing toward the back side. In this case, as shown in the drawings, the effective light beam width W1 of the image light GL1 reflected in the central portion 23k can be adjusted so as to be roughly the same as the other effective light beam widths W2, W3. Further, in the configuration in which, for example, there is a possibility that the component of the image light entering the entrance side of the image take-out section 23 is partially cut during the period from when entering the deep side of the reflecting surfaces 23a, 23b, namely the +X side, to when being reflected by the reflecting unit 23c to be taken out, it is also possible to assure the effective light beam width by increasing the sizes of the reflecting units 23c located on the entrance side. On this occasion, it is possible, for example, to set the size of the reflecting unit 23c in the vicinity of the central portion 23k to the minimum, and gradually increase the sizes of the reflecting units 23c toward the peripheral portions 23m, 23h.

Further, it is also possible to configure the image take-out section 23 in which the sizes or the pitches of the reflecting units 23c vary in a stepwise fashion by arranging a plurality of reflecting units 23c having the same size as a block, and including at least one block in the array of the number of reflecting units 23c. On this occasion, assuming that the incident angles of the light beams of the image lights are angles $\alpha_1, \alpha_2$, respectively, and the pitches of the reflecting units 23c to which the light beams of the image lights are input are pitches $d_1, d_2$, respectively, $d_1 = d_2$ is true in the same block even in the case of $\alpha_1 < \alpha_2$, and in the entire image take-out section 23, $d_1 \leq d_2$ can be made true with respect to any values of the angles $\alpha_1, \alpha_2$ fulfilling $\alpha_1 < \alpha_2$. It should be noted that in the case of FIG. 3, $d_1<d_2$ is true with respect to any values of the angles $\alpha_1$, $\alpha_2$ fulfilling $\alpha_1<\alpha_2$.

As described above, regarding the degree of variation in size of the reflecting units 23c, various configurations can be adopted, and it is also possible to adjust the sizes of the respective reflecting units 23c unit-by-unit so that the effective light beam widths of the image lights emitted from the respective reflecting units 23c are all equal to each other.

It should be noted that although it is assumed in the example shown in, for example, FIG. 2A that the first reflecting surface 23a is roughly perpendicular to the first total reflection surface 22a, the orientation of the first reflecting surface 23a can arbitrarily be adjusted in accordance with the specifications of the light guide plate 20 providing the effective light beam width W can be assured. For example, it is possible to arrange that the first reflecting surface 23a forms any tilted angle within a range from, for example, 80° to 100° counterclockwise taking the −Z direction with respect to the first total reflection surface 22a as a reference. Further, regarding the orientation of the second reflecting surface 23b, it is possible to arrange that the second reflecting surface 23b forms any tilted angle within a range from, for example, 30° to 40° counterclockwise taking the −Z direction with respect to the first total reflection surface 22a as a reference. As a result, the second reflecting surface 23b has any relative angle within a range from 40° to 70° with respect to the first reflecting surface 23a.

Second Embodiment

A second embodiment obtained by modifying the first embodiment will hereinafter be explained with reference to, for example, FIG. 6A. Since a light guide plate 120 according to the present embodiment has substantially the same structure as that of the light guide plate 20 shown in, for example, FIG. 1A except the structure of the image take-out section, FIGS. 6A and 6B show only the schematic enlarged views of a part and the periphery of the part of an image take-out section 123 corresponding to the image take-out section 23 shown in FIGS. 2B and 2C, and the illustration and the explanation of the structure of the light guide plate and the entire virtual image display device will be omitted.

In the light guide plate 120, the image take-out section 123 is composed of a number of linear reflecting units 123c arranged in a stripe manner, and the reflecting units 123c are each composed of a first reflecting surface 123a and a second reflecting surface 123b forming a V shape or a wedge shape in the X-Z cross-sectional view as a set, and are arranged in the Z direction similarly to the reflecting units 23c shown in, for example, FIG. 2A.

Figure 6A:
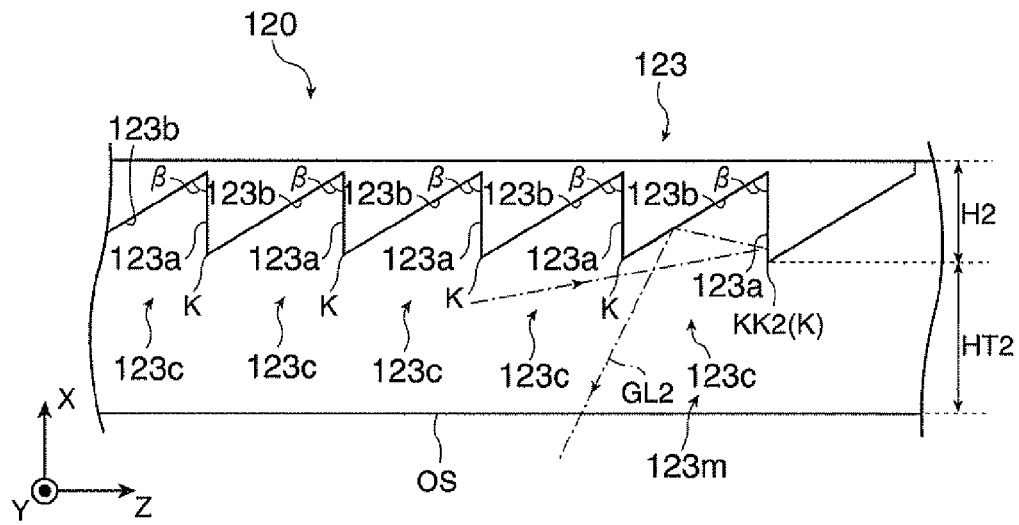
FIG. 6A is a diagram for explaining the structure of a back-side part of an image take-out section in a light guide plate according to a second embodiment.
Figure 6B:
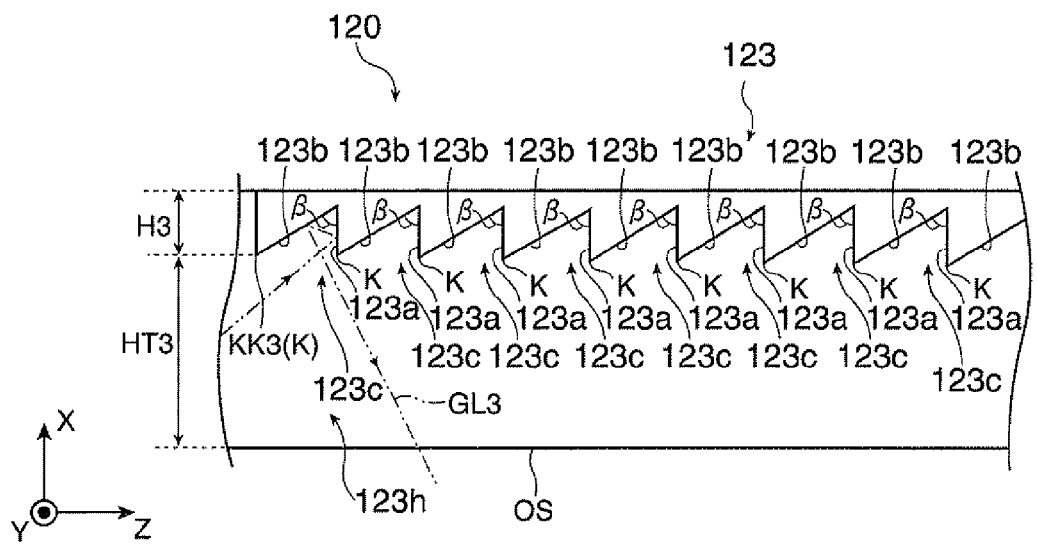
FIG. 6B is a cross-sectional view for explaining the structure of an entrance-side part of the image take-out section.

Here, as shown in FIGS. 6A and 6B, the nearer to the back side, namely the +Z side the reflecting units 123c are located, the larger the size or the pitch of the reflecting units 123c becomes. On this occasion, the size of the reflecting unit 123c located on the back side of the image take-out section 123, namely the peripheral portion 123m side, and corresponding to the image light GL2 is set to be the largest, and the size of the reflecting unit 123c located on the entrance side of the image take-out section 123, namely the peripheral portion 123h side, and corresponding to the image light GL3 is set to be the smallest. In particular, here the thickness of the image take-out section 123 is not constant with respect to the depth direction, namely the X direction, but varies in accordance with the sizes of the reflecting units 123c. Specifically, the larger the size of the reflecting unit 123c is, the further the apex K as the emission side end thereof projects toward the light emission surface OS side, namely the −X side, and the closer to the light emission surface OS the apex K comes, and the thickness H2 of the image take-out section 123 on the back side, namely the +Z side with respect to the X direction shown in FIG. 6A is set to be larger than the thickness H3 of the image take-out section 123 in the entrance side shown in FIG. 6B. In other words, the distance HT2 from the apex KK2 as the emission side end of the reflecting unit 123c corresponding to the image light GL2 shown in FIG. 6A to the light emission surface OS is set to be shorter than the distance HT3 from the apex KK3 as the emission side end of the reflecting unit 123c corresponding to the image light GL3 shown in FIG. 6B to the light emission surface OS. Thus, it is arranged that the larger the incident angle of the image light and the larger the size of the reflecting unit 123c is, the more efficiently the reflecting unit 123c takes in the image light. It should be noted that the degree of the projection of the image take-out section 123 can variously be controlled in accordance with the optical specifications.

According to the light guide plate 120 of the second embodiment explained hereinabove, the sizes of the respective reflecting units 123c vary in the image take-out section 123 along the Z direction in association with the state of the total reflection angle, namely the incident angle, and further, the larger the size of the reflecting unit 123c is, the further the reflecting unit 123c projects toward the light emission surface OS. Thus, the effective light beam width of the image light is sufficiently assured to thereby make it possible to avoid the deterioration in the image light caused by the reflection in the reflecting units 123c, and as a result, the degradation of the resolution of the image due to the virtual image light thus emitted can be prevented. Further, the image light can efficiently be taken in the image take-out section 123.

Third Embodiment

Figure 7A:
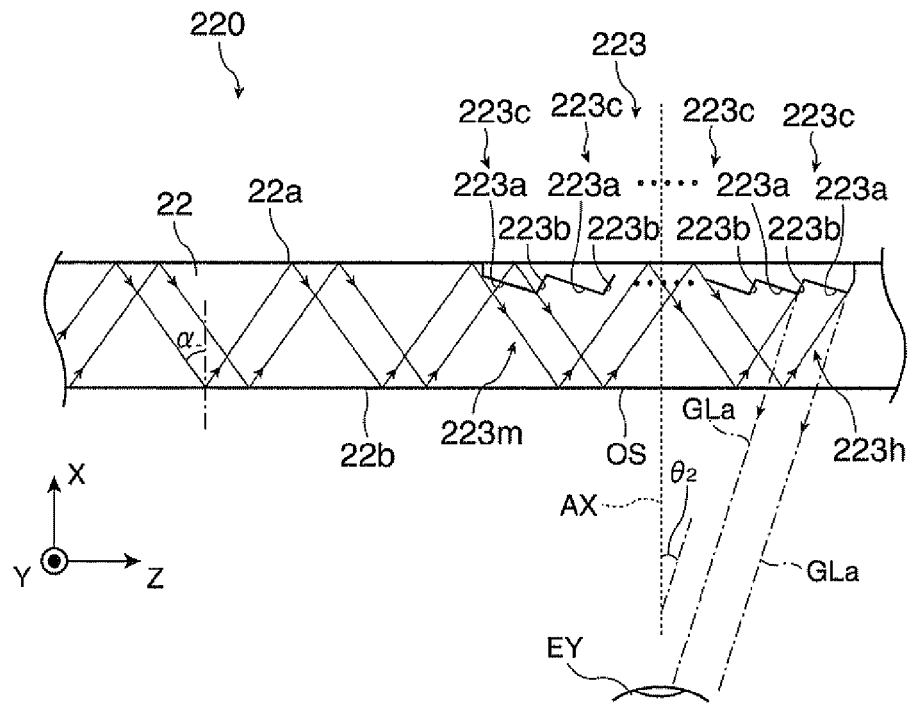
FIG. 7A is a diagram for explaining the structure of a back-side part of an image take-out section in a light guide plate according to a third embodiment.

A third embodiment obtained by modifying, for example, the first embodiment will hereinafter be explained with reference to, for example, FIG. 7A. Since a light guide plate 220 according to the present embodiment has substantially the same structure as that of the light guide plate 20 shown in, for example, FIG. 1A except the structure of the image take-out section, FIGS. 7A and 7B show only the schematic enlarged views of a part and the periphery of the part of an image take-out section 223 corresponding to the image take-out section 23 shown in FIGS. 2B and 2C, and the illustration and the explanation of the structure of the light guide plate and the entire virtual image display device will be omitted.

Hereinafter, a detailed structure of the image take-out section 223 of the light guide plate 220 according to the present embodiment will be explained. As shown in FIGS. 7A and 7B, the image take-out section 223 is composed of a number of image light reflecting surfaces 223a, and each of the image light reflecting surfaces 223a extends in a direction extending perpendicular to the Z direction in which the image light reflecting surfaces 223a are arranged, namely the Y direction. The number of image light reflecting surfaces 223a are parallel to each other, and are formed as partial reflecting surfaces having the same angle with the first total reflection surface 22a, transmitting some of the light component of the image light, and reflecting the rest thereof. It should be noted that the image light reflecting surfaces 223a are connected to each other via a boundary section 223b not provided with the function as the reflecting surface for taking out the image light. As a result, the image light reflecting surfaces 223a are arranged periodically and repeatedly along the Z direction and extend in parallel to each other. It is assumed here that one of the image light reflecting surfaces 223a and one of the boundary sections 223b adjacent to this image light reflecting surface 223a are treated as a set, and are referred to as a reflecting unit 223c.

Hereinafter, the image light GLa and the image light GLb entering the both end sides of the image take-out section 223 among the components of the image light will be explained. As a premise, the image light including the image lights GLa, GLb enters the light guide plate 20 shown in, for example, FIGS. 1A and 1B via the light entrance surface IS, and is then reflected by the incident light bending section 21, then proceeds in the +Z direction deflected to the −X direction as a whole in the light guide section 22, and is then guided while repeating the total reflection on the first and second total reflection surfaces 22a, 22b of the light guide section 22 as shown in, for example, FIG. 7A, and then reaches the image take-out section 223. Firstly, as shown in FIG. 7A, the image light GLa totally reflected by the first and second total reflection surfaces 22a, 22b of the light guide section 22 with the minimum reflection angle $\alpha_-$ passes through the image take-out section 223 N times (N is a natural number larger than 1), then reaches the image light reflecting surface 223a located on the backmost side (the +Z side) of the peripheral portion 223m of the image take-out section 223, and is then emitted from the light emission surface OS toward the eye EY as a parallel light beam at an angle $\theta_2$ with the optical axis AX as the center axis of the eye EY due to the reflection on the image light reflecting surface 223a. The emission angle on this occasion is an obtuse angle with the +Z axis. It should be noted here that the reflection angle $\alpha_-$ of the image light GLa is defined as the incident angle with respect to the image light reflecting surface 223a.

Figure 7B:
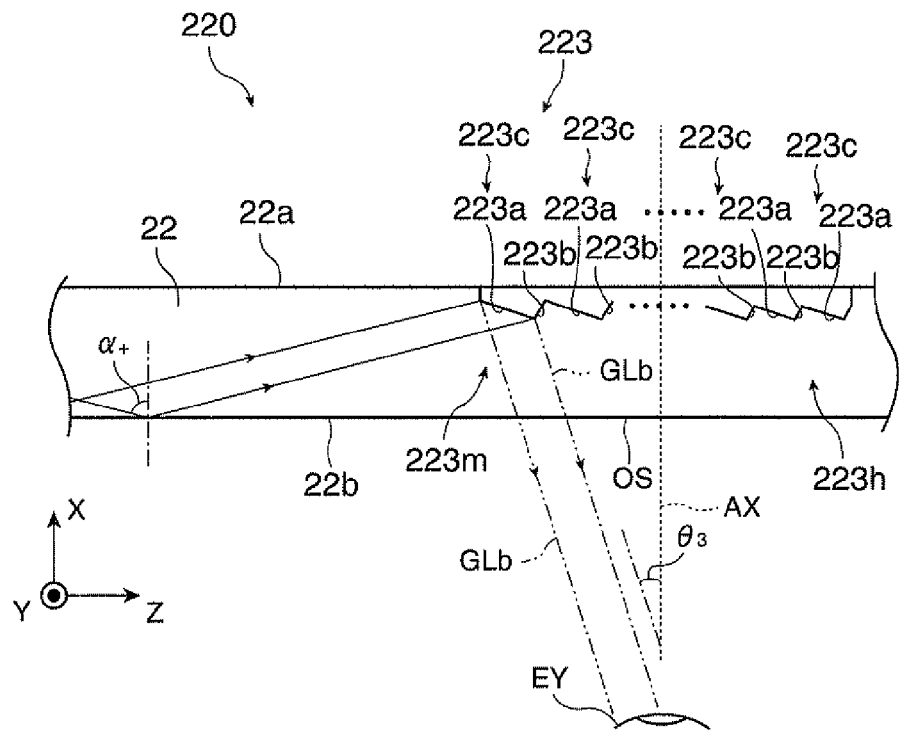
FIG. 7B is a cross-sectional view for explaining the structure of an entrance-side part of the image take-out section.

On the other hand, as shown in FIG. 7B, the image light GLa totally reflected by the first and second total reflection surfaces 22a, 22b of the light guide section 22 with the maximum reflection angle $\alpha_+$ reaches the image light reflecting surface 223a located nearest to the entrance (the −Z side) in the peripheral portion 223h of the image take-out section 223, and is then emitted from the light emission surface OS toward the eye EY as a parallel light beam at an angle $\theta_3$ with the optical axis AX due to the reflection on the image light reflecting surface 223a. The emission angle on this occasion is an acute angle with the +Z axis. It should be noted here that the reflection angle $\alpha_+$ of the image light GLb is defined as the incident angle with respect to the image light reflecting surface 223a.

It should be noted that the angle $\theta_2$ of the image light GLa and the angle $\theta_3$ of the image light GLb have roughly the same sizes and respective directions opposite to each other, and are arranged to correspond to the field angles of the virtual image by the image light.

Here, the size or the pitch of the reflecting units 223c, namely the image light reflecting surfaces 223a, is arranged that the nearer to the entrance side, namely the −Z side, the reflecting unit 223c is located, the larger the size or the pitch is. Specifically, the size of the image light reflecting surface 223a located on the entrance side of the image take-out section 223, namely the peripheral portion 223h side, and corresponding to the image light GLb is set to be the largest, and the size of the image light reflecting surface 223a located on the back side of the image take-out section 223, namely the peripheral portion 123m side, and corresponding to the image light GLa is set to be the smallest. In other words, it is arranged that the larger angle the image light corresponding to the image light reflecting surface 223a has with respect to the reflecting angle on the total reflection surfaces 22a, 22b, namely the incident angle to the image take-out section 223, the larger size the image light reflecting surface 223a has.

Thus, it is possible to arrange that the effective light beam width of the entire image light becomes larger than a certain value.

As described above, also in the third embodiment, the size or the pitch of the reflecting units 223c varies in the image take-out section 223 along the Z direction in association with the state of the total reflection angle, namely the incident angle. Thus, the effective light beam width of the image light is sufficiently assured to thereby make it possible to avoid the deterioration in the image light caused by the reflection in the reflecting units 223c, and as a result, the degradation of the resolution of the image due to the virtual image light thus emitted can be prevented. It should be noted that although the thickness is constant with respect to the depth direction of the image take-out section 223, namely the X direction in the above description, it is also possible to vary the thickness in accordance with the size of the reflecting unit 223c.

Other Issues

Although the invention is hereinabove explained along the embodiments, the invention is not limited to the embodiments described above, but can be put into practice in various forms within the scope or the spirit of the invention, and the following modifications, for example, are also possible.

Although in the explanation described above it is arranged that the sizes of the reflecting units 23c are different from each other as an example of the variation in the shape of the reflecting surface in the number of reflecting units 23c, it is also possible to vary, for example, the orientation of the reflecting unit 23c constituting the image take-out section 23 besides or in addition the above as the variation in the shape of the reflecting surface. In other words, it is also possible to perform minute rotation around the Y axis on the orientation of the reflecting unit 23c to thereby adjust the orientation. On this occasion, there is no need to make the orientations of all of the reflecting units 23c correctly coincide with each other as long as the relative angles β in all of the reflecting units 23c are made to coincide with each other.

Although in the explanation described above the transmissive liquid crystal device 11 is used as the image display element, the image display element is not limited to the transmissive liquid crystal device, but various devices can be used therefor. For example, the configuration using the reflective liquid crystal panel is also possible, and it is also possible to use the digital micromirror device and so on instead of the liquid crystal device 11. Further, the configuration using the light-emitting element represented by, for example, an LED array or an OLED (organic EL) is also possible. Further, the configuration using the laser scanner obtained by combining a laser light source and a scanner such as a polygon mirror is also possible. It should be noted that it is also possible to adjust the brightness pattern taking the light take-out characteristics of the image take-out section 23 into consideration in the liquid crystal device 11 and the light source thereof.

Although in the explanation described above although it is assumed that the virtual image display device 100 is provided with the set of the image forming device 10 and the light guide plate 20 corresponding to each of the right and left eyes, it is also possible to adopt the configuration of providing the image forming device 10 and the light guide plate 20 corresponding to either one of the right and left eyes to thereby view the image with a single eye.

Although in the explanation described above the see-through virtual image display device is described, if there is no need to make the observer observe the external image, it is possible to set the light reflectance of both of the first and second reflecting surfaces 23a, 23b to approximately 100%.

Although in the explanation described above, the light entrance surface IS and the light emission surface OS are disposed on the same plane, the configuration is not limited thereto, but it is also possible to dispose the light entrance surface IS on the same surface as the first total reflection surface 22a, and the light emission surface OS on the same surface as the second total reflection surface 22b, for example.

Although in the explanation described above the mirror layer 21a constituting the incident light bending section 21 and the angle of the tilted surface RS are not particularly mentioned, the angle of the mirror layer 21a and so on with respect to the optical axis OA can be set to various values in accordance with the purpose and the specifications.

Although in the explanation described above the V-shaped groove formed by the reflecting unit 23c is shown as if the tip thereof is in the pointed state, the shape of the V-shaped groove is not limited thereto, but can be one having the tip cut flatly or one having the tip provided with a round shape.

Although in the explanation described above the specific explanation is made assuming that the virtual image display device 100 of the embodiments is the head-mount display, it is also possible to modify the virtual image display device 100 according to the embodiment into a head-up display.

Although in the explanation described above it is assumed that in the first and second total reflection surfaces 22a, 22b, the image light is totally reflected on the interface with air to thereby guide the image light without providing a mirror or a half mirror on the surface, the total reflection in the invention should include the reflection performed by the mirror coat or the half mirror film formed on the entire or a part of each of the first and second total reflection surfaces 22a, 22b. For example, there is included the case in which the mirror coat or the like is applied to the entire or a part of each of the total reflection surfaces 22a, 22b with the incident angle of the image light fulfilling the total reflection condition, thereby reflecting the substantially whole image light. Further, it is also possible to coat the entire or a part of each of the total reflection surfaces 22a, 22b with a mirror with some transmissive property providing the image light with sufficient brightness can be obtained.

The entire disclosure of Japanese Patent Application No. 2010-236195, filed Oct. 21, 2010 is expressly incorporated by reference herein.

What is claimed is:

1. A light guide plate comprising:
a light entrance section adapted to take in an image light inside, and project the image light into a plurality of light rays travelling in different directions;
a light guide section having a first total reflection surface and a second total reflection surface extending so as to be opposed to each other, and adapted to guide the image light taken in from the light entrance section by total reflection on the first total reflection surface and the second total reflection surface;
an image take-out section comprising:
a plurality of reflecting units arranged in a predetermined arranging direction, and adapted to make it possible to take out the image light, which enters via the light guide section, to an outside by a bend of a light path in the plurality of reflecting units,
a first reflecting unit adapted to perform the bend of the light path on the image light having a relatively large total reflection angle, and
a second reflecting unit adapted to perform the bend of the light path on the image light having a relatively small total reflection angle,
a reflecting surface of the first reflecting unit being larger than a reflecting surface of the second reflecting unit,
the first total reflection surface and the second total reflection surface extending from the light source guide section through the image take-out section, and the plurality of reflecting units of the image take-out section having a constant thickness H measured from the first total reflection surface, which forms an upper boundary portion of the plurality of reflecting units, to a line L connecting apexes K forming a lower boundary portion of the plurality of reflecting units, and
the plurality of reflecting units of the image take-out section having a varying thickness measured from the first total reflection surface to apexes P forming an upper boundary portion of the plurality of reflecting units, the plurality of reflecting units including a plurality of minute mirrors, each of the plurality of minute mirrors extending between a respective one of the plurality of apexes K and a respective one of the plurality of apexes P; and
a light emission section adapted to emit the image light, which passes through the image take-out section, to the outside,
shapes of reflecting surfaces of the plurality of reflecting units varying along the predetermined arranging direction in the image take-out section in accordance with a value of a total reflection angle of the image light, which is bent by the plurality of reflecting units, in the light guide section so as to prevent degradation of resolution of the image light,
a first light ray of the plurality of light rays being reflected by a closest reflection surface to the light entrance section, the first light ray having a maximum reflection angle with respect to the first total reflection surface and the second total reflection surface, and the closest reflection surface being the reflecting surface of the plurality of reflecting units that is closest to the light entrance section in the predetermined arranging direction, and
a second light ray of the plurality of light rays being reflected by a furthest reflection surface to the light entrance section, the second light ray having a minimum reflection angle with respect to the first total reflection surface and the second total reflection surface, and the furthest reflection surface being the reflecting surface of the plurality of reflecting units that is furthest from the light entrance section in the predetermined arranging direction.

2. A virtual image display device comprising:
the light guide plate according to claim 1; and
an image forming device adapted to form the image light to be guided by the light guide plate.

3. The light guide plate according to claim 1, wherein
a distance from a light emission surface of the light emission section to a tip of each of the reflecting units of the image take-out section with respect to an emission direction of the image light bent is constant.

4. A virtual image display device comprising:
the light guide plate according to claim 3; and
an image forming device adapted to form the image light to be guided by the light guide plate.

5. The light guide plate according to claim 1, wherein
sizes of the reflecting units vary so as to keep an effective light beam width of the image light entering each of the reflecting units in a value larger than a predetermined value.

6. A virtual image display device comprising:
the light guide plate according to claim 5; and an image forming device adapted to form the image light to be guided by the light guide plate.

7. The light guide plate according to claim 1, wherein assuming that incident angles of light beams of the image light each entering two of the plurality of reflecting units of the image take-out section at respective angles different from each other are respectively $\alpha_1$, $\alpha_2$, and pitches of the two reflecting units, which the light beams of the image light enter, are respectively $d_1$, $d_2$, $d_1 \leq d_2$ is true if $\alpha_1 < \alpha_2$ is true.

8. A virtual image display device comprising:
the light guide plate according to claim 7; and
an image forming device adapted to form the image light to be guided by the light guide plate.

9. The light guide plate according to claim 1, wherein pitches of the plurality of reflecting units vary in a range of 0.5 mm through 1.3 mm.

10. A virtual image display device comprising:
the light guide plate according to claim 9; and
an image forming device adapted to form the image light to be guided by the light guide plate.

11. The light guide plate according to claim 1, wherein each reflecting unit constituting the plurality of reflecting units is mainly composed of a first reflecting surface and a second reflecting surface forming a predetermined angle with the first reflecting surface, and reflects the image light, which is guided by the light guide section, by the first reflecting surface, and further reflects the image light, which is reflected by the first reflecting surface, by the second reflecting surface to thereby perform the bend of the light path.

12. A virtual image display device comprising:
the light guide plate according to claim 11; and
an image forming device adapted to form the image light to be guided by the light guide plate.

13. The light guide plate according to claim 11, wherein a size of the reflecting unit located on an anti-light entrance section side distant from the light entrance section out of the plurality of reflecting units is larger than a size of the reflecting unit located on the light entrance section side.

14. A virtual image display device comprising:
the light guide plate according to claim 13; and
an image forming device adapted to form the image light to be guided by the light guide plate.

15. The light guide plate according to claim 11, wherein a pitch of the reflecting units located on an anti-light entrance section side distant from the light entrance section out of the plurality of reflecting units is larger than a pitch of the reflecting units located on the light entrance section side.

16. A virtual image display device comprising:
the light guide plate according to claim 15; and
an image forming device adapted to form the image light to be guided by the light guide plate.

17. A virtual image display device comprising:
the light guide plate according to claim 1; and
an image forming device adapted to form the image light to be guided by the light guide plate.

* * * * *